United States Patent
Zhu et al.

(10) Patent No.: US 11,468,273 B2
(45) Date of Patent: Oct. 11, 2022

(54) SYSTEMS AND METHODS FOR DETECTING AND CLASSIFYING ANOMALOUS FEATURES IN ONE-DIMENSIONAL DATA

(71) Applicant: CABLE TELEVISION LABORATORIES, INC., Louisville, CO (US)

(72) Inventors: Jingjie Zhu, Erie, CO (US); Karthik Sundaresan, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 585 days.

(21) Appl. No.: 16/577,304

(22) Filed: Sep. 20, 2019

(65) Prior Publication Data

US 2020/0097775 A1    Mar. 26, 2020

Related U.S. Application Data

(60) Provisional application No. 62/778,112, filed on Dec. 11, 2018, provisional application No. 62/733,738, filed on Sep. 20, 2018.

(51) Int. Cl.
*G06G 7/00*    (2006.01)
*G06K 9/62*    (2022.01)
(Continued)

(52) U.S. Cl.
CPC ......... *G06K 9/6268* (2013.01); *G06K 9/6256* (2013.01); *G06N 3/04* (2013.01);
(Continued)

(58) Field of Classification Search
CPC .. G06K 9/6268; G06K 9/6256; G06K 9/6265; G06K 9/00536; G06K 9/6271;
(Continued)

(56) References Cited

U.S. PATENT DOCUMENTS

| 2017/0277727 A1* | 9/2017 | Chen ................. G06F 16/24578 |
| 2020/0005899 A1* | 1/2020 | Nicula .................... G16H 50/20 |
| 2020/0226735 A1* | 7/2020 | Peng .................... G06K 9/6284 |

FOREIGN PATENT DOCUMENTS

| CN | 110021019 A | * | 7/2019 | ........... G06N 3/0454 |
| JP | 2004181096 A | * | 7/2004 | ........... G06T 7/0012 |

OTHER PUBLICATIONS

Google scholar search.*

* cited by examiner

*Primary Examiner* — Xin Jia
(74) *Attorney, Agent, or Firm* — David Daniel Smith

(57) ABSTRACT

The present disclosure generally relates to apparatus, software and methods for detecting and classifying anomalous features in one-dimensional data. The apparatus, software and methods disclosed herein use a YOLO-type algorithm on one-dimensional data. For example, the data can be any one-dimensional data or time series, such as but not limited to be power over time data, signal to noise ratio (SNR) over time data, modulation error ratio (MER) data, full band capture data, radio frequency data, temperature data, stock data, or production data. Each type of data may be susceptible to repeating phenomena that produce recognizable anomalous features. In some embodiments, the features can be characterized or labeled as known phenomena and used to train a machine learning model via supervised learning to recognize those features in a new data series.

20 Claims, 16 Drawing Sheets

(51) Int. Cl.
*G06N 3/08* (2006.01)
*G06N 3/04* (2006.01)
*H04L 25/03* (2006.01)

(52) U.S. Cl.
CPC .......... *G06N 3/08* (2013.01); *H04L 25/03165* (2013.01); *G06K 9/6265* (2013.01)

(58) Field of Classification Search
CPC .......... G06N 3/04; G06N 3/08; G06N 3/0454; G06N 7/005; H04L 25/03165; G06V 10/82
See application file for complete search history.

SYSTEMS AND METHODS FOR DETECTING AND CLASSIFYING ANOMALOUS FEATURES IN ONE-DIMENSIONAL DATA

CROSS-REFERENCE TO RELATED APPLICATIONS

This application claims the benefit of and priority to U.S. Provisional Patent Application Nos. 62/733,738, filed Sep. 20, 2018, and 62/778,112, filed Dec. 11, 2018, each of which is hereby incorporated herein by reference in its entirety.

STATEMENT REGARDING FEDERALLY SPONSORED RESEARCH

None.

BACKGROUND

There are many challenges related to detecting patterns within a series of data. For example, in anomaly detection within a time series, traditional methods like ARIMA (autoregressive integrated moving average) and sliding window median methods, might be useful for detecting sudden changes in a data series, but these methods require good thresholds, they cannot recognize actual patterns, and they can be fooled by slow and smooth changes. Newer methods like RNN (recurrent neural network) and LSTM (long short-term memory, derived from RNN) can be used to detect patterns or anomalies in a data series but with noisy data they are hard to train and implement, and their pattern prediction confidence is questionable if the training data set is not clean and well prepared.

Feature detection in two-dimensional image data sets generally uses "You Only Look Once" (YOLO) algorithms, which are currently recognized as having the best speed performance for object detection and recognition. (Redmon et al., "You Only Look Once: Unified, Real-Time Object Detection" (9 May 2016), accessed Sep. 18, 2019 at arxiv.org/pdf/1506.02640.pdf; Redmon et al. "YOLOv3: An Incremental Improvement" (8 Apr. 2018), accessed Sep. 18, 2019 at arxiv.org/abs/1804.02767.) Instead of doing straight classifications on all region proposals from techniques like Moving Windows+Anchor Boxes, which is expensive on computation, YOLO regresses out object bounding boxes together with an object's class distribution in one pass. In prediction, YOLO predicts on all boxes in a predefined S×S grid (the training process is similar but has back propagation for weight updates). The prediction output of each of these grid cells is encoded as Number of Bounding Boxes Predicted*5, and the 5 values are x, y, w, h, c, which are x coordinate of the center inside cell, y coordinate of the center inside cell, bounding box predicted width, bounding box predicted height, and bounding box confidence. The other outputs are probability predictions of classes. For example, if the algorithm predicts 2 bounding boxes for each cell it will encode 10 values for the base prediction, and they are followed by probabilities of each object type (20 classes will have 20 values here). After sorting these predictions of class probabilities, for a class, a threshold can be used to set all boxes with low probability predictions on this class to zero and then a non-max suppression algorithm can be applied to create only a few result boxes as the actual prediction outputs. However, application of traditional YOLO algorithms to one-dimensional data is overly complicated and resource intensive.

SUMMARY

The present disclosure generally relates to apparatus, software and methods for detecting and classifying anomalous features in one-dimensional data. The apparatus, software and methods disclosed herein use a YOLO-type algorithm on one-dimensional data. For example, the data can be any one-dimensional data or time series, such as but not limited to be power over time data, signal to noise ratio (SNR) over time data, modulation error ratio (MER) data, full band capture data, radio frequency data, temperature data, vibration sensor data, humidity data, voltage data, electrical current data, pH value over time data, motion sensor data, stock data or production data. Each type of data may be susceptible to repeating phenomena that produce recognizable anomalous features. In some embodiments, the features can be characterized or labeled as known phenomena and used to train a machine learning model via supervised learning to recognize those features in a new data series. The apparatus, software and methods are particularly good at detecting data spikes and at efficiently detecting multiple, even overlapping, features within a one-dimensional data series.

In an embodiment, the apparatus, software and methods disclosed herein detect and classify anomalous features in one-dimensional spectral data for a cable network. For example, the spectral data may be radio frequency data, optical data, electrical data or combinations thereof. In one instantiation, the spectral data is download modulation error ratio (Rx MER) data from a digital transmitter, where data analysis is expedited using a YOLO-type of algorithm.

In an aspect, a method for detecting and classifying an anomalous feature in one-dimensional data comprises using a one-dimensional convolutional layer to generate a bounding region containing a single spatial variable around an anomalous feature within one-dimensional test data and to determine whether the anomalous feature in the one-dimensional test data falls into a class of anomalous features taught to a neural network using one-dimensional training data. In an embodiment, the single spatial variable is x.

In an embodiment, a method for detecting and classifying an anomalous feature in one-dimensional data comprises using multiple one-dimensional convolutional layers.

In an embodiment, a method for detecting and classifying an anomalous feature in one-dimensional data further comprises training a neural network to detect and classify anomalous features in one-dimensional training data. In an embodiment, the width of an anomalous feature in the training data relative to the width of the training data is maintained at all times during the training, detection and/or classification. In an embodiment, the scale of an anomalous feature in the training data relative to the overall scale of the training data is not changed during the training process.

In an embodiment, a neural network is trained on one-dimensional data that has been smoothed, value scale shifted, flipped, floor shifted, noise injected and/or synthesized. Such techniques referred to herein as "data augmentation techniques". In an embodiment, synthesized data may be fully fabricated or injected with one or more anomalous feature(s). For example, synthesizing data by injecting real data with an anomalous feature may involve: identifying an anomalous feature in a one-dimensional data sample; and moving the anomalous feature into another location in the one-dimensional data set or inserting the anomalous feature into another one-dimensional data set. In an embodiment, data augmentation techniques are randomly applied to training data sets and, in some embodiments, a method of performing data augmentation weights particular techniques for more or less frequent application to training data sets.

In an embodiment, one-dimensional test data is time series data. For example, the one-dimensional test data may be power over time data, signal to noise ratio (SNR) over time data, modulation error ratio (MER) data, full band capture data, radio frequency data, temperature data, vibration sensor data, humidity data, voltage data, electrical current data, pH value over time data, motion sensor data, etc.

In an embodiment, using a one-dimensional convolutional layer to generate a bounding region is carried out by a YOLO-type algorithm.

In an embodiment, a bounding region comprises, consists of, or consists essentially of x, w, class, and a confidence value for indicating a likelihood of an anomalous feature being present, where x is the center of the bounding region, w is the width of the bounding region, and class is an ID number associated with the class of the anomalous feature.

In an embodiment, a method for detecting and classifying an anomalous feature in one-dimensional data further comprises localizing an anomalous feature within one-dimensional test data and/or identifying one or more devices generating the one-dimensional test data comprising the anomalous feature. For example, the anomalous feature may be selected from the group consisting of LTE ingress, a MER spike, amplifier suckout, frequency roll-off, waves, wireless interference patterns, tilt patterns, sweep signal patterns and combinations thereof.

In an embodiment, a method comprises scaling one-dimensional test data while preserving anomalous features by: increasing a number of data points within the one-dimensional test data to generate up-sampled one-dimensional data that is divisible by a predetermined integer; dividing the up-sampled data into a number of bins equal to the predetermined integer; calculating a single value for each bin; and replacing each bin with the single value to obtain down-sampled data. In an embodiment, the step of increasing the number of data points uses nearest neighbor interpolation, linear interpolation, cubic interpolation, bilinear interpolation, etc. In an embodiment, the single value for each bin is the mean, median, mode, average, minimum, maximum, or quantile of data points within the bin.

In an aspect, a non-transitory computer-readable medium has a plurality of non-transitory instructions executable with a processor for detecting and classifying anomalous features in one-dimensional data, the plurality of non-transitory instructions being executable for using a one-dimensional convolutional layer to generate a bounding region containing a single spatial variable around an anomalous feature within one-dimensional test data and to determine whether the anomalous feature in the one-dimensional test data falls into a class of anomalous features taught to a neural network using one-dimensional training data.

In an embodiment, the plurality of non-transitory instructions is further executable for training a neural network to detect and classify anomalous features in one-dimensional training data.

In an embodiment, the plurality of non-transitory instructions is further executable for localizing an anomalous feature within one-dimensional test data and/or identifying one or more devices generating the one-dimensional test data comprising the anomalous feature.

In an embodiment, a plurality of non-transitory instructions is executable for scaling the one-dimensional test data while preserving anomalous features by: increasing a number of data points within the one-dimensional test data to generate up-sampled one-dimensional data that is divisible by a predetermined integer; dividing the up-sampled data into a number of bins equal to the predetermined integer; and calculating a single value for each bin; and replacing each bin with the single value to obtain down-sampled data.

BRIEF DESCRIPTION OF THE DRAWINGS

Illustrative embodiments of the present invention are described in detail below with reference to the attached drawings.

DETAILED DESCRIPTION

Figure 1A:
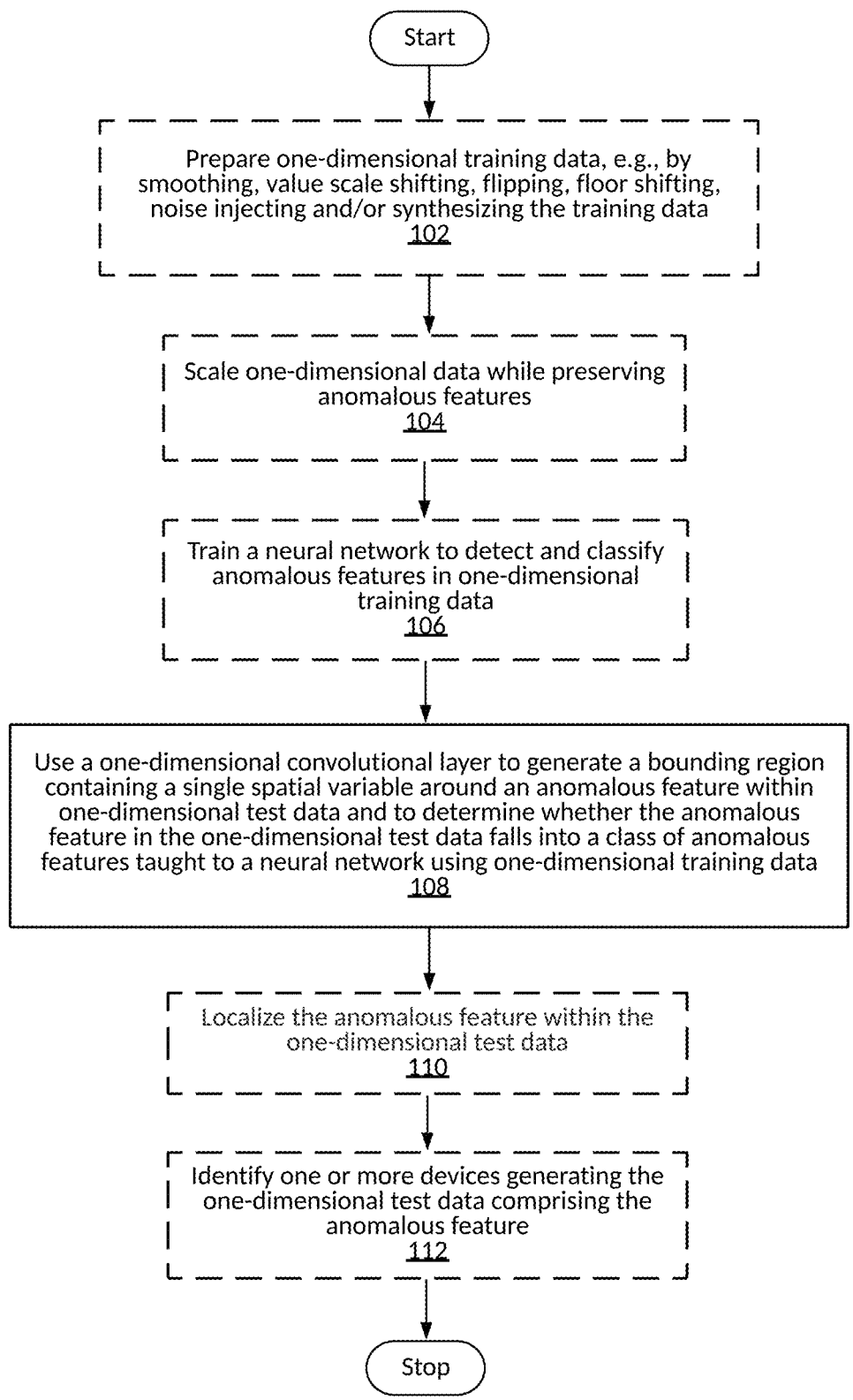
FIG. 1A is a flowchart illustrating steps in a method for detecting and classifying an anomalous feature in one-dimensional data, according to multiple embodiments.

In general, the terms and phrases used herein have their art-recognized meaning, which can be found by reference to standard texts, journal references and contexts known to those skilled in the art. The following definitions are provided to clarify their specific use in the context of this description.

As used herein, "one-dimensional data" refers to a one-dimensional or substantially linear array of data points.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, proactive network maintenance (PNM) data is any data useful for detect impending failure conditions on a network, such as but not limited to bandwidth demand, collision frequency, time of day, temperature, other environmental conditions, location of a device, movement of a failure condition (transience), and the like.

As used herein, modulation error ratio (MER) data quantifies the performance of a digital transmitter or receiver in a network. For example, imperfect digital signals may include noise, carrier suppression, distortion and other features that can be observed when the digital signal is demodulated. Thus, MER data may be characterized as one type of PNM data.

One-Dimensional Anomalous Feature Detection Algorithms

In exemplary embodiments, methods and algorithms for detecting and classifying anomalous features in one dimensional data use at least one one-dimensional convolutional layer. Non-square kernels (1-D kernels or bounding regions) are used at the convolutional layer. The stride and kernel size vary for different network designs. Generally, the input series are resized/down sampled to adapt to different input shapes with fixed network input size. The training label is formed as: [class, x, width], where the class is the ID number of an object class, x is the center of the target, and width is the width of the target. Both x and width in the label are represented as a percentage number (0 to 1) based on the original total sample width. The prediction from each YOLO-type layer per each anchor (each layer predicts on 3 anchors, 9 anchors in total for the 3 YOLO-type layer architecture) is formed as (assuming there are 2 classes): [obj_center, obj_width, objectness, probability_class1, probability_class2]. The grid window where the center of the target object is located may be called the responsible grid or responsible bounding region, and the left edge of this grid may be termed the responsible grid/bounding region left position. The assigned anchor window is selected during training by calculating IOUs (intersection over union) between each anchor window and the target (only by width, the same center is assigned to both the anchor window and the target in this process) and selecting the anchor window with the highest IOU. The obj_center is then post processed by applying logistic activation and adding with the responsible grid left corner, this improves model stability. The obj_width is then post processed by exp(obj_width)*assigned_anchor_window_width for better model stability as well. There are three YOLO-type layers in the network design to form a feature pyramid network for different grid scales for better detection performance. The convolutional layers above each YOLO-type layer have (3*num_classes)*num_anchors_per_layer filters and they use linear activation. Other convolutional layers use leaky ReLU activations (negative slope=0.1) and use batch normalization instead of using dropout layers for better generalization. Routing layers (concatenation layers) and shortcut layers (adding up previous layer values) may be used to send features directly from previous layers to the current layer to reduce the information loss when doing convolutions.

As an example, assume a network input size of 416 is applied, the first YOLO-type layer performs predictions on 13 grids (evenly split windows on the original sample), the second YOLO-type layer performs predictions on 26 grids, and the third YOLO-type layer performs predictions on 52 grids. These different grid scales are created by applying multiple convolution layers with stride size 2 and applying upsampling (e.g., using a nearest neighbor algorithm) layers. The prediction outputs are aggregated together, softmax is performed to find the class prediction and non-max suppression is used to remove redundant non-optimal predictions. Different input sizes can be applied for better accuracy or speed.

Data Scaling

Methods disclosed herein can be used to scale data while preserving anomalous features. For example, the methods keep the information of single value spikes in the original sample while down-sampling. If necessary, data may be up-sampled (e.g., using nearest neighbor interpolation) to a resolution that can be divided by a preset value, say 416. Thus, suppose the input sample is 1880 in length, the up-sampled data will be 2080. The up-sampled data may then be down-sampled by dividing it into bins, in this case, 2080 values are divided into 416 bins with each bin containing 5 consecutive values. By taking the bin minimums, it is possible to generate samples of size 416 with necessary details.

Data Augmentation

Data augmentation may be performed on training samples to improve prediction accuracy and avoid overfitting. For example, the following data augmentation techniques may be used alone or in combination: smoothing, value scale shifting, flipping, floor shifting, noise injection, and location changes. In an embodiment, smoothing may comprise applying a savitzky golay filter with random window sizes within a range to smooth the input data before performing down-sampling. In an embodiment, the value scale of the original sample may be changed randomly by first normalizing a sample by its mean value, adjusting all values by a random factor, and adding the mean value back to all values. In an embodiment, flipping may be accomplished by randomly flipping (left-right) the sample with its labels to create a mirror image of the input sample. In an embodiment, the floor of a sample can be randomly changed for all values by subtracting/adding a random value to the original values. In an embodiment, noise can be randomly injected into the original sample. In an embodiment, locations of anomalous features can be changed by randomly cutting an anomalous feature on the x-axis of the sample and moving it to another location on the x-axis of the same sample or injecting it into another sample in order to obtain better training results on every grid window. Such data augmentation techniques have increased the mAP (mean average precision) on detecting small and dense objects by a few percent (e.g., the mAP on detecting spikes on RxMER values has been increased by about 4%).

Loss Functions

Below is a loss function (No. 1) that may be used in methods disclosed herein:

Localization loss:

$$\lambda_{coord}\sum_{i=0}^{S}\sum_{j=0}^{B}1_{i,j}^{obj}(x_i - \hat{x}_i)^2 + \lambda_{coord}\sum_{i=0}^{S}\sum_{j=0}^{B}1_{i,j}^{obj}\left(\sqrt{w_i} - \sqrt{\hat{w}_i}\right)^2$$

Confidence loss (if object is detected):

$$\sum_{i=0}^{S}\sum_{j=0}^{B}1_{i,j}^{obj}(C_i - \hat{C}_i)^2$$

Confidence loss (if object is NOT detected):

$$\lambda_{noobj}\sum_{i=0}^{S}\sum_{j=0}^{B}1_{i,j}^{obj}(C_i - \hat{C}_i)^2$$

Classification loss:

$$\sum_{i=0}^{S}1_i^{obj}\sum_{c\in classes}(p_i(c) - \hat{p}_i(c))^2$$

The final loss is the sum of all the above.

Below is a loss function (No. 2) that may be used in methods disclosed herein:

Localization loss:

$$\lambda_{coord}\sum_{i=0}^{S}\sum_{j=0}^{B}1_{i,j}^{obj}(x_i - \hat{x}_i)^2 + \lambda_{coord}\sum_{i=0}^{S}\sum_{j=0}^{B}1_{i,j}^{obj}\left(\sqrt{w_i} - \sqrt{\hat{w}_i}\right)^2.$$

Confidence loss: Binary Cross-entropy loss
Classification loss: Binary Cross-entropy loss The final loss is the sum of all the above.

Object-loss is accumulated on the best anchors (i.e., those having the highest IOU with targets) within grids that are responsible for the targets. No-object-loss is accumulated on all the anchors in all the grids that are not assigned for predicting any target, however, if for any anchor box the IOU between its predicted result and the target is greater than a threshold, say 0.7, loss from those anchor boxes is ignored, so that they do not contribute to the gradient calculation.

Optimizers

In an embodiment, SGD (stochastic) may be used with 6000 burn-in mini-batches and 0.9 momentum, 0.001 learning rate, 0.0005 weight decay. During the burn-in time the learning rate increases gradually until it reaches the target learning rate to create a good initialization for SGD.

Adam optimizer (Adaptive Moment Estimation) may also be used to have faster and smoother convergence. For example, optimizing training with these techniques leads to convergence on 20000 samples and 5 classes in a few hours.

Labeling Techniques

To reduce labor, labeling techniques were developed to start the training. 100-200 samples were hand labeled, the objects were cut out and pasted into random locations in samples that were generated by a synthetic data generator with different noise backgrounds and tilts. Spikes, suckouts (using two non-linear functions and some randomizations), roll-offs (randomized non-linear functions) and waves (randomized sine waves) were also generated. The model trained on these automatically generated samples has been working well on real samples.

For continuous learning and model improvements, accurate predictions performed on real-world samples can be selected and used directly in the training process.

Advantages

With this neural network, data series (time series data such as power over time or SNR over time; or MER data, or full-band capture data) can be applied to the prediction engine, and with a well-trained weights file, patterns on data series are automatically recognized and predicted with confidence scores. Additional advantages include:

1. Accurate pattern localization that can work on dynamic input/window sizes for data series;
2. High performance that can analyze an entire plant footprint in minutes or hours with reduced cost and generate high level abstracted information. (On a single CPU core, the methods disclosed herein analyze about 1000 samples per second, on GPUs this speed could be accelerated hundreds of times);
3. Model size is small and memory footprint is small as well. This allows the detection mechanism to be pushed down into embedded devices like cable modems for distributed computation and better proactive network maintenance;
4. Disclosed methods work well on overlapping patterns;
5. Amenable to continuous training and adding/removing classes;
6. Fewer false predictions and more stable compared to traditional methods;
7. Training data can be readily fabricated.

FIG. 1A is a flowchart illustrating steps in a method for detecting and classifying an anomalous feature in one-dimensional data. The method begins with optional step 102 of preparing one-dimensional training data. The preparation may involve, for example, smoothing, value scale shifting, flipping, floor shifting, noise injecting and/or synthesizing the training data. In optional step 104, one-dimensional data is scaled while preserving anomalous features present in the data. Steps involved in the scaling process are described in greater detail in FIG. 1B. In optional step 106, a neural network is trained to detect and classify anomalous features in one-dimensional training data, which may or may not have been prepared and/or scaled, as described above, prior to the training. In step 108, a one-dimensional convolutional layer is used to generate a bounding region containing a single spatial variable around an anomalous feature within one-dimensional test data and to determine whether the anomalous feature in the one-dimensional test data falls into a class of anomalous features taught to a neural network using one-dimensional training data. The anomalous feature(s) within the one-dimensional data is/are simultaneously detected, based on a confidence value of the bounding region, and classified by the YOLO-type algorithms disclosed herein. In optional step 110, the anomalous feature(s) is/are localized within the one-dimensional test data set. The feature position or location may be defined, for example, as a center position of a bounding region or as a range of the bounding region defined by endpoints thereof. The localization data can be applied in optional step 112 to identify one or more devices generating the one-dimensional test data comprising the anomalous feature. For example, if the one-dimensional data is downlink modulation error ratio (RxMER) data from a plurality of cable modems, and an anomalous feature in the MER data is localized to a particular frequency range, cable modems operating on that frequency range can be identified as the responsible devices.

Figure 1B:
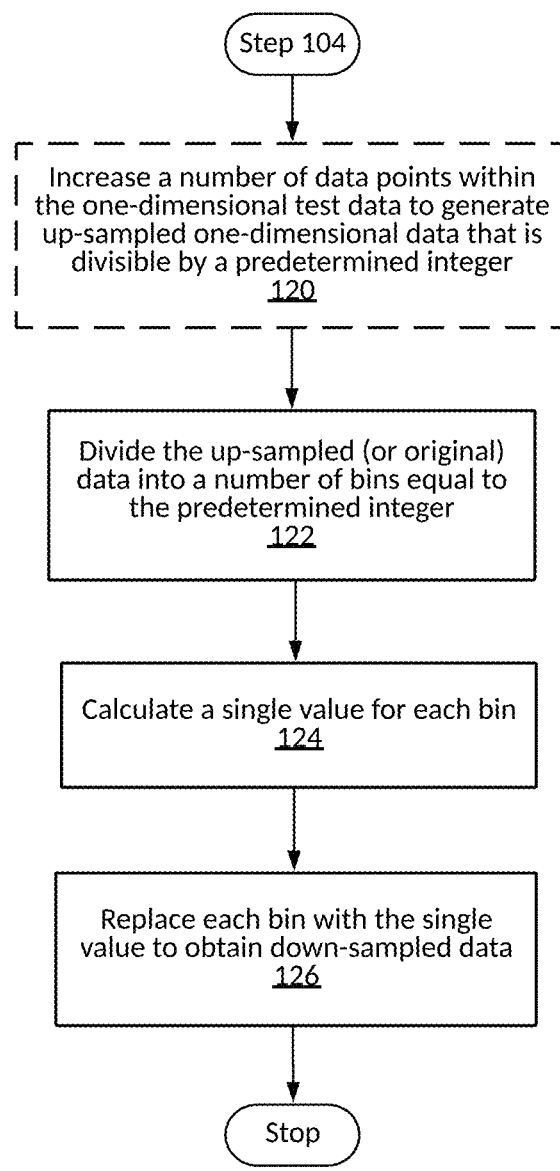
FIG. 1B is a flowchart illustrating steps involved in the scaling process of step 106 of FIG. 1A in greater detail.

Steps involved in the scaling process of step 104 are described in greater detail in FIG. 1B. In optional step 120, a number of data points within one-dimensional data is increased to generate up-sampled one-dimensional data that is divisible by a predetermined integer. Step 120 is optional because it is possible that an original data set will have a number of data points divisible by the predetermined integer. In step 122, the up-sampled (or original) data is divided into a number of bins equal to the predetermined integer and a single value for each bin is calculated, in step 124. For example, the single value for each bin might be the mean, median, mode, average, minimum, maximum, or quantile of data points within the bin. Each bin is then replaced with the single value to obtain down-sampled data, in step 126. Throughout the scaling process, the width of an anomalous feature(s) relative to the width of the entire data set is maintained. Thus, an anomalous feature that occupies, say, 35% of the width of the data set prior to scaling will also occupy 35% of the width of the data set after scaling.

Figure 2:
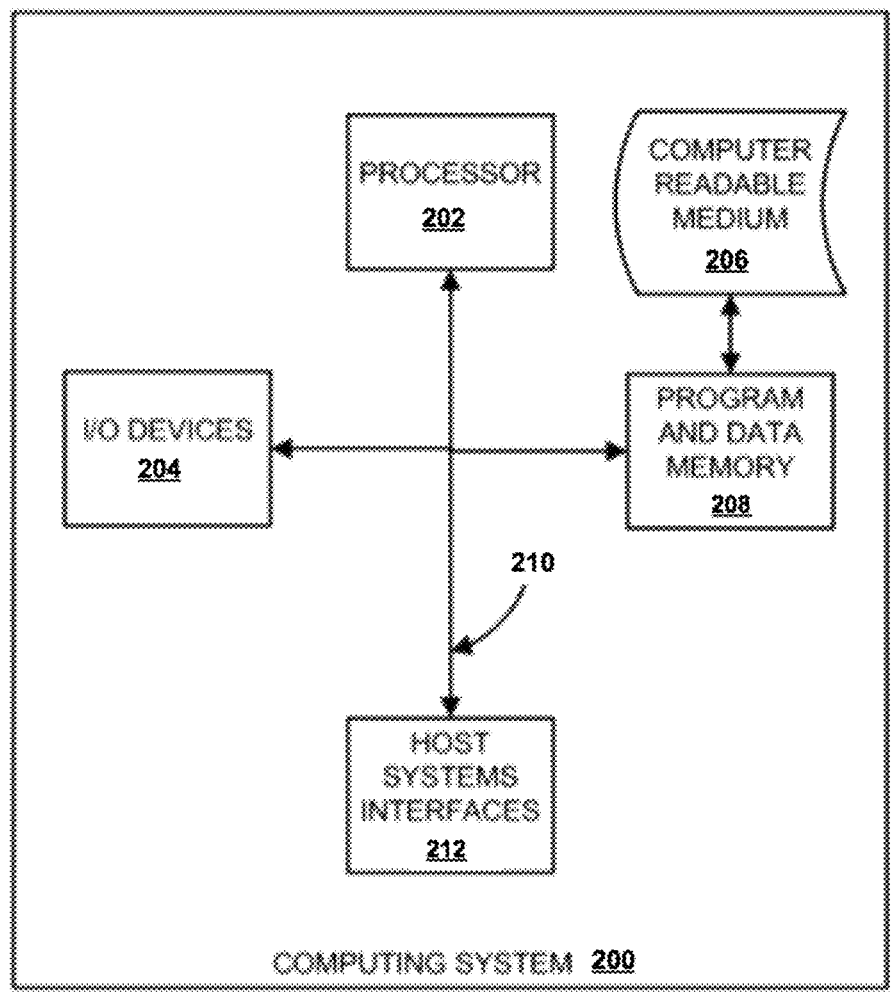
FIG. 2 is a block diagram of an exemplary computing system in which a computer readable medium provides instructions for performing methods described herein.
Figure 3:
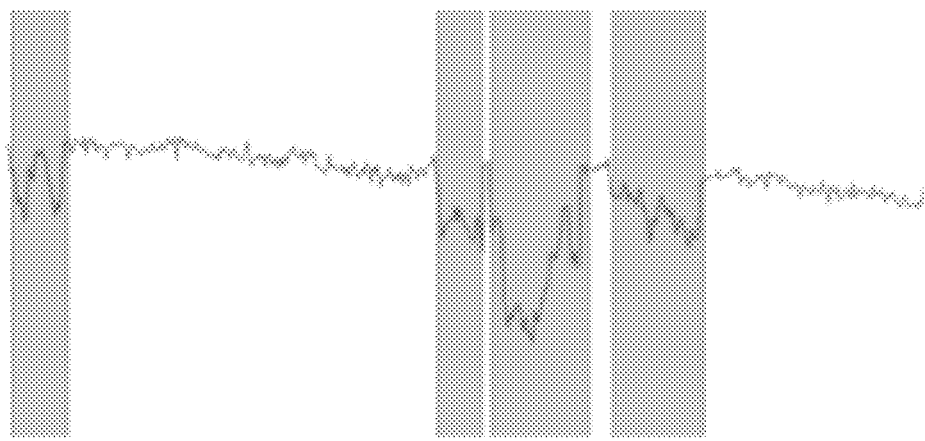
FIGS. 3, 4, 5, 6, 7 and 8 show graphs of actual network data with LTE ingress features that were detected and classified by the methods disclosed herein shaded.
Figure 4:
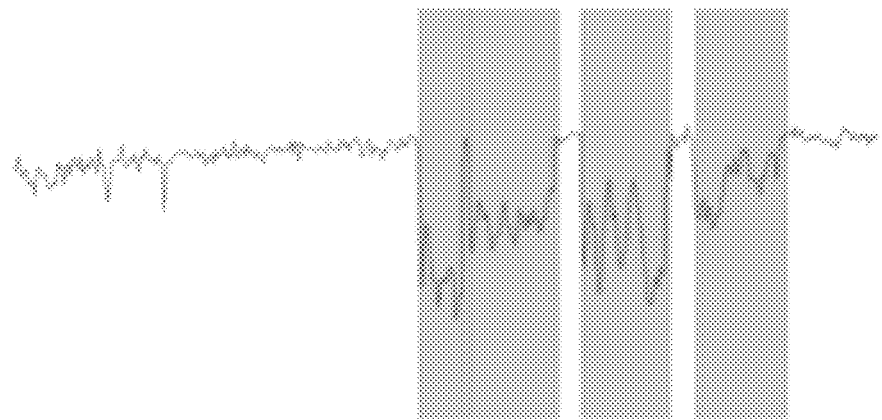
Figure 5:
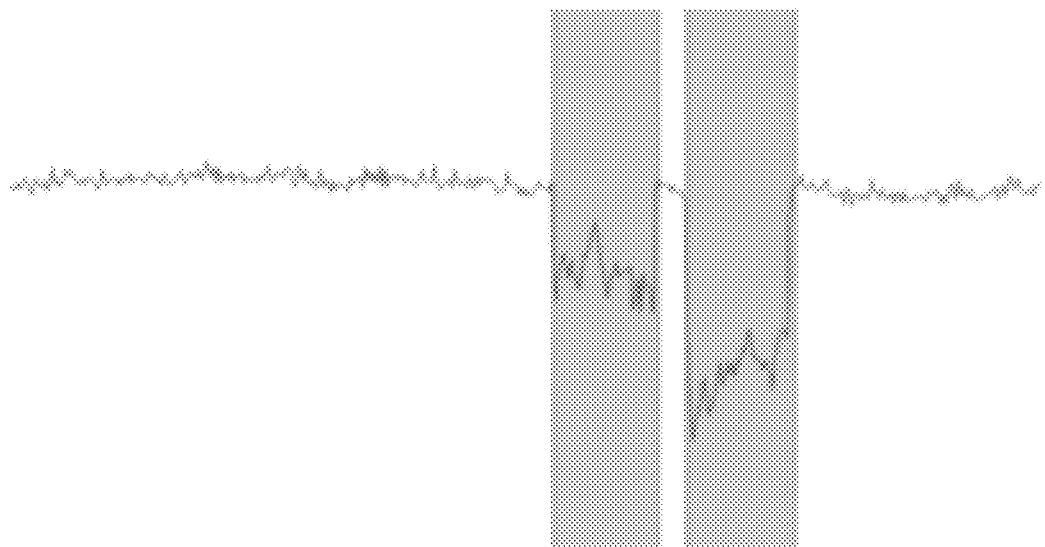
Figure 6:
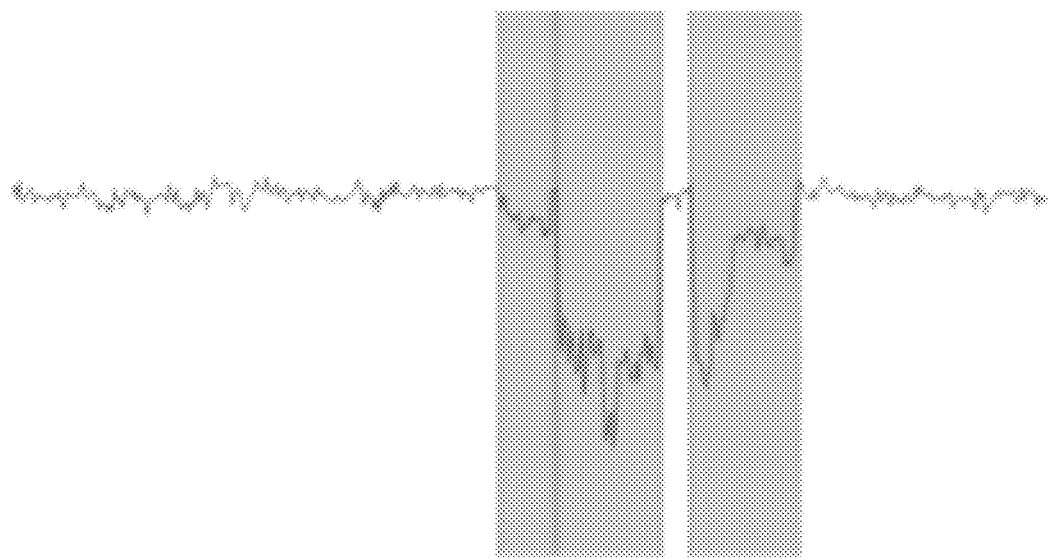
Figure 7:
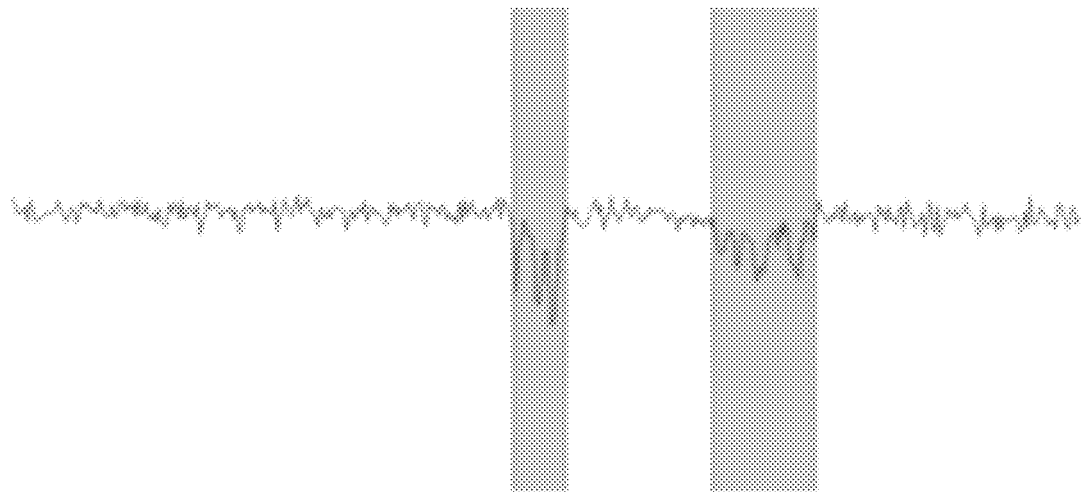
Figure 8:
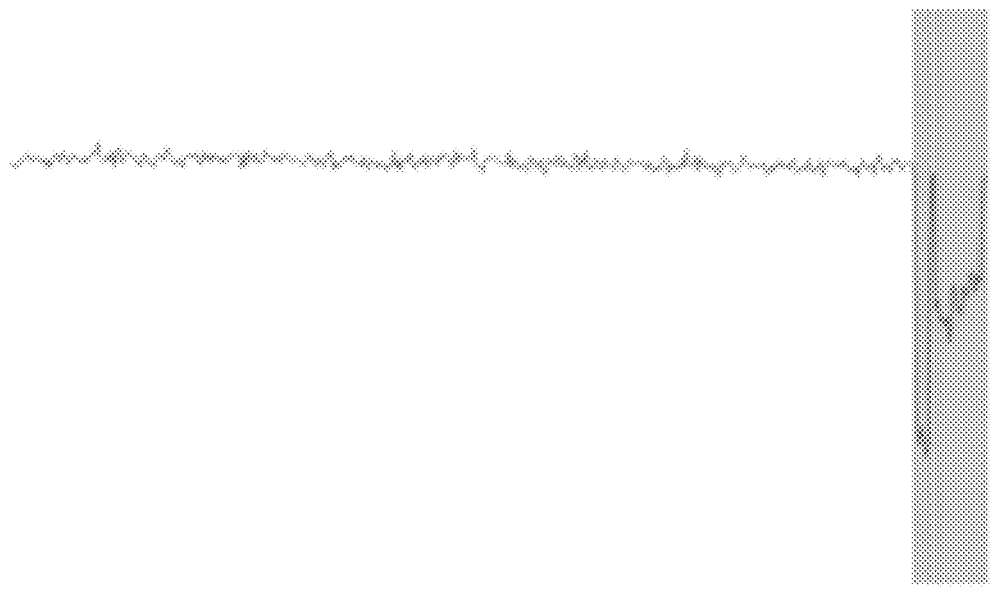

The embodiments herein may be implemented in a variety of ways as a matter of design choice. For example, the invention can take the form of an entirely hardware embodiment, an entirely software embodiment or an embodiment containing both hardware and software elements. In an embodiment, the invention is implemented in software, which includes but is not limited to firmware, resident software, microcode, etc. FIG. 2 illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The apparatus, software and methods disclosed herein are further illustrated by the following Example. This Example is for illustrative purposes only and is not intended to limit the disclosure.

Example

Training was performed on hand labeled data and synthetic data. The total number of training data was 20000 sets, and the test dataset size was 10000. Five classes were included in the training. The mAP (mean average precision) is shown below:

1027.16 samples per second.
Average Precisions:
 lte: 0.9921
 spike: 0.9364
 wave: 0.9842
 rolloff: 0.9915
 suckout: 0.9835
mAP: 0.9775

Figure 9:
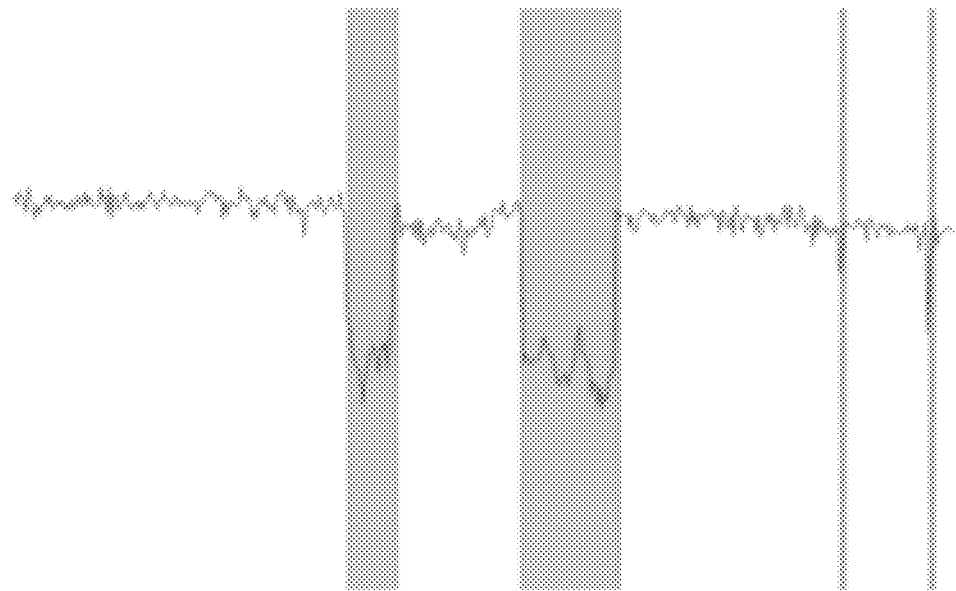
FIG. 9 shows a graph of RxMER data having two LTE ingress features and two spikes that were detected and classified by the methods disclosed herein shaded.
Figure 10:
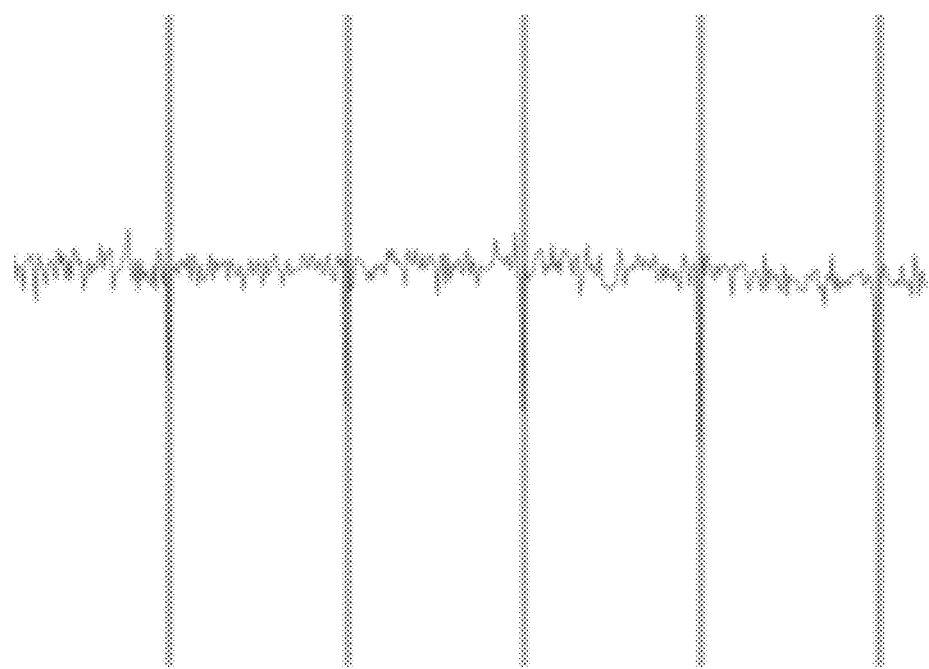
FIG. 10 shows a graph of RxMER data having five spikes that were detected and classified by the methods disclosed herein shaded.
Figure 11:
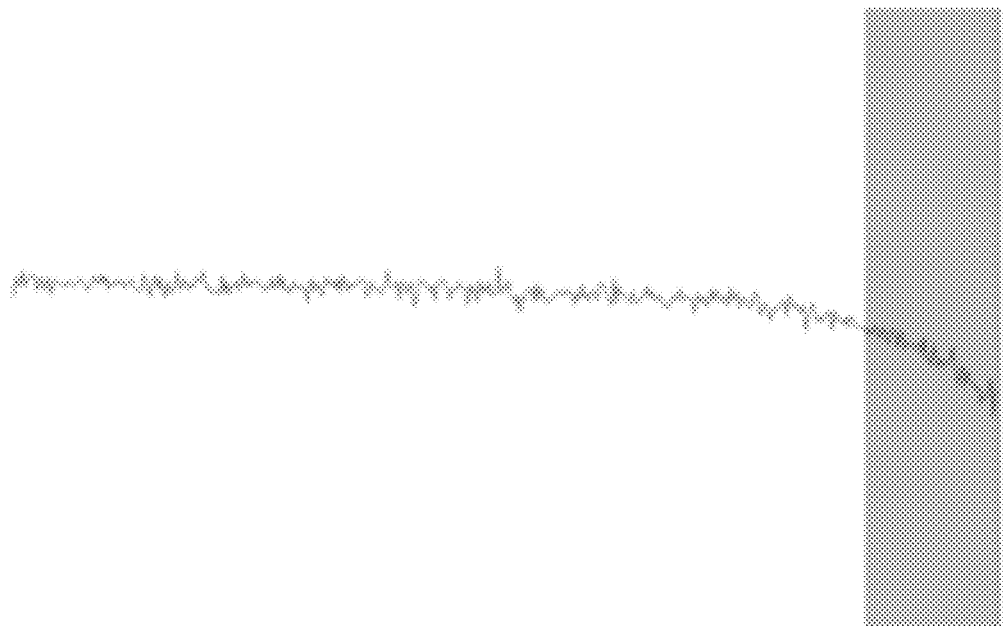
FIG. 11 shows a graph having roll-off on the higher frequency side of an orthogonal frequency domain multiplex (OFDM) channel that was detected and classified by the methods disclosed herein shaded.
Figure 12:
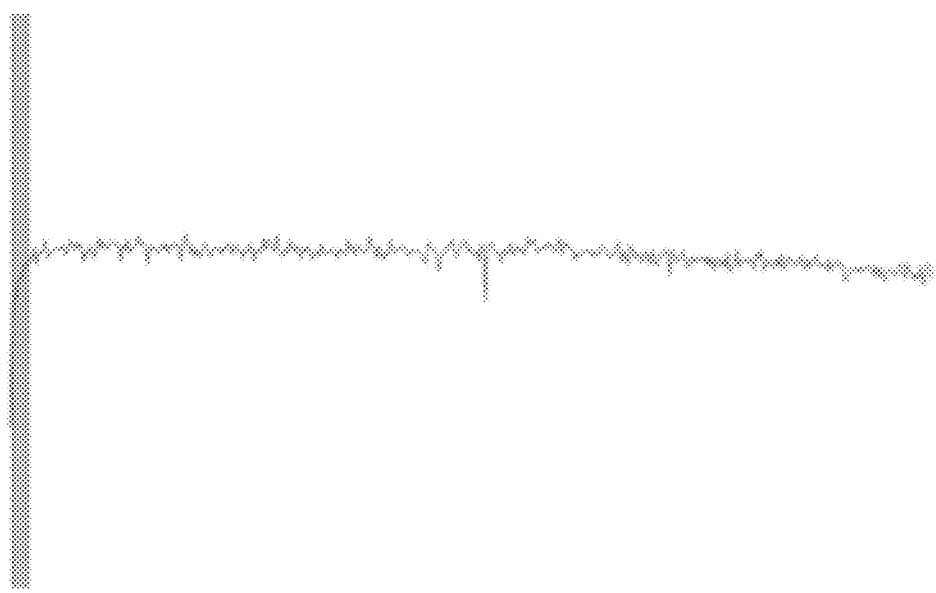
FIG. 12 shows a graph having roll-off on the low frequency end of an orthogonal frequency domain multiplex (OFDM) channel that was detected and classified by the methods disclosed herein shaded.
Figure 13:
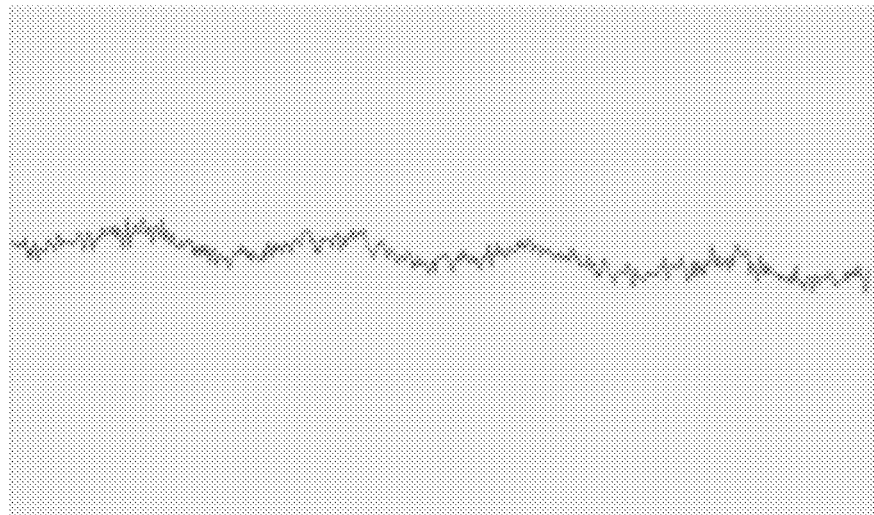
FIG. 13 shows a graph having a wide standing wave on an orthogonal frequency domain multiplex (OFDM) channel that was detected and classified by the methods disclosed herein shaded.
Figure 14:
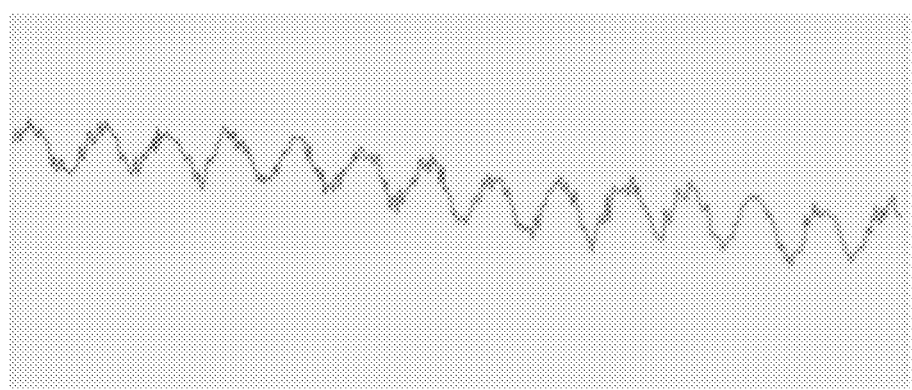
FIG. 14 shows a graph having a relatively narrow standing wave on an orthogonal frequency domain multiplex (OFDM) channel that was detected and classified by the methods disclosed herein shaded.
Figure 15:
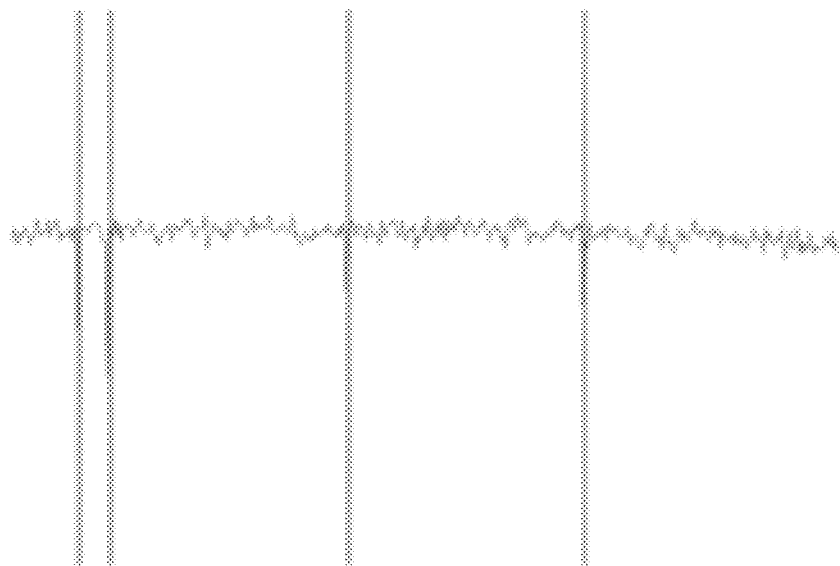
FIG. 15 shows a graph having four spikes that were detected and classified by the methods disclosed herein shaded.
Figure 16:
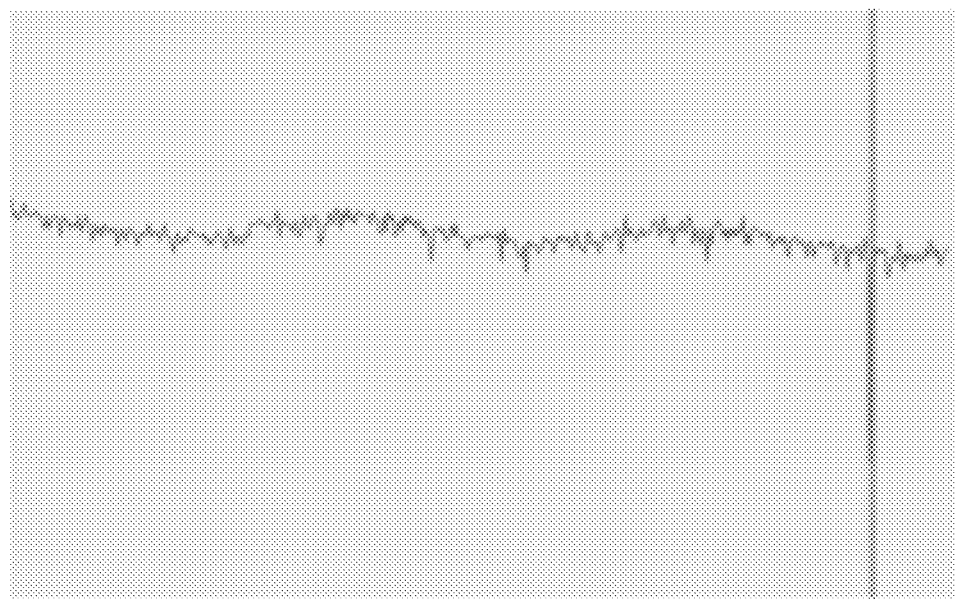
FIG. 16 shows a graph having a wide standing wave with a significant spike on an orthogonal frequency domain multiplex (OFDM) channel that was detected and classified by the methods disclosed herein shaded.
Figure 17:
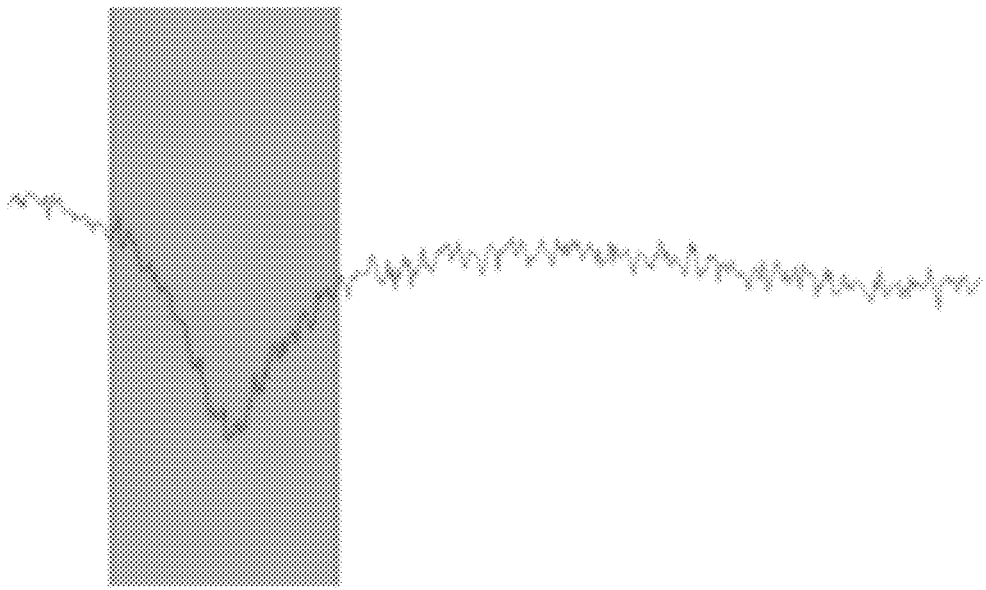
FIG. 17 shows a graph having a wide and deep suckout that was detected and classified by the methods disclosed herein shaded.
Figure 18:
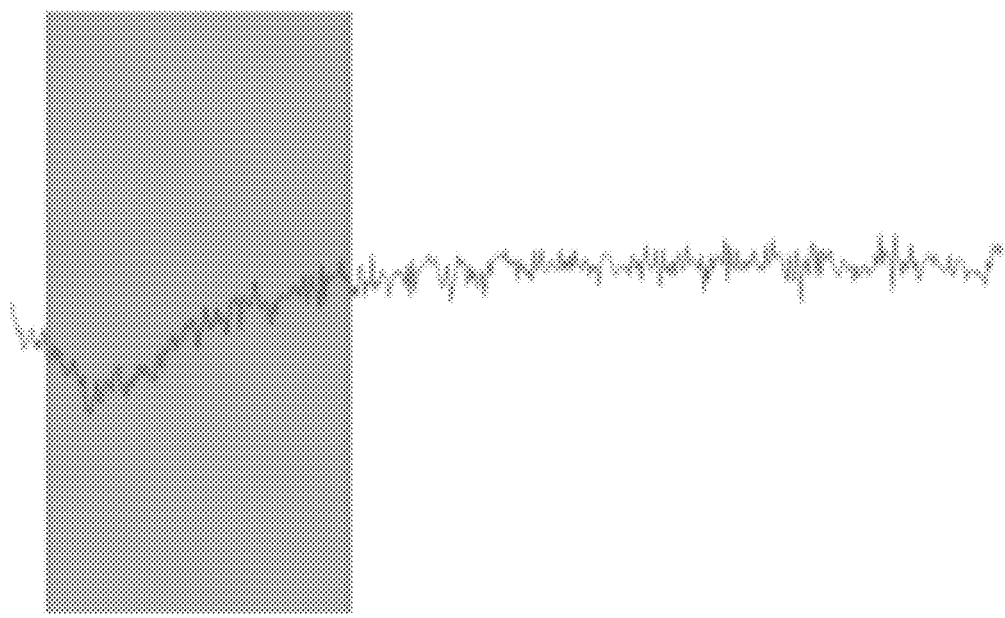
FIGS. 18, 19 and 20 show graphs of suckouts on an orthogonal frequency domain multiplex (OFDM) channel that were detected and classified by the methods disclosed herein shaded.
Figure 19:
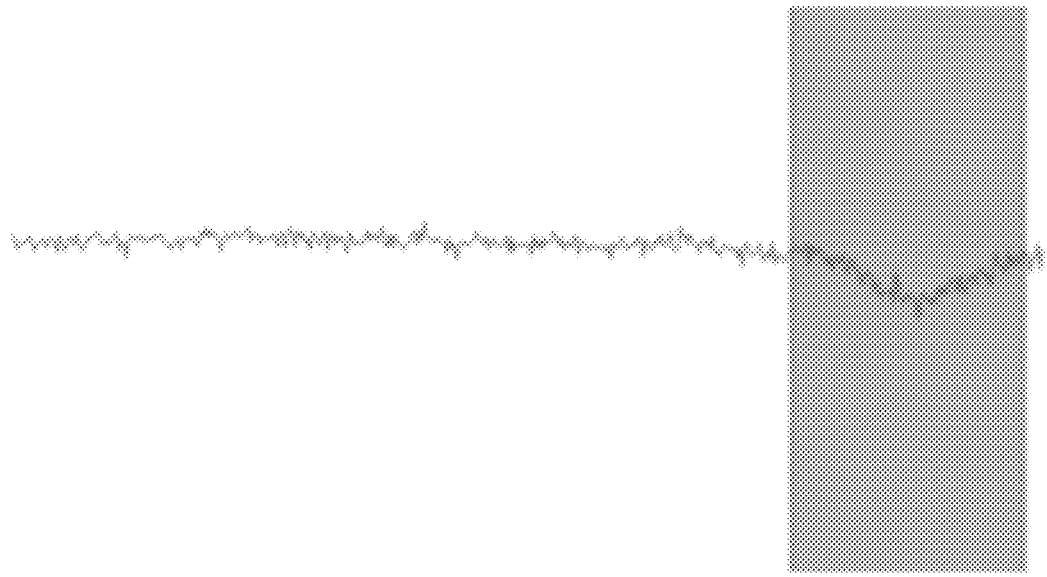
Figure 20:
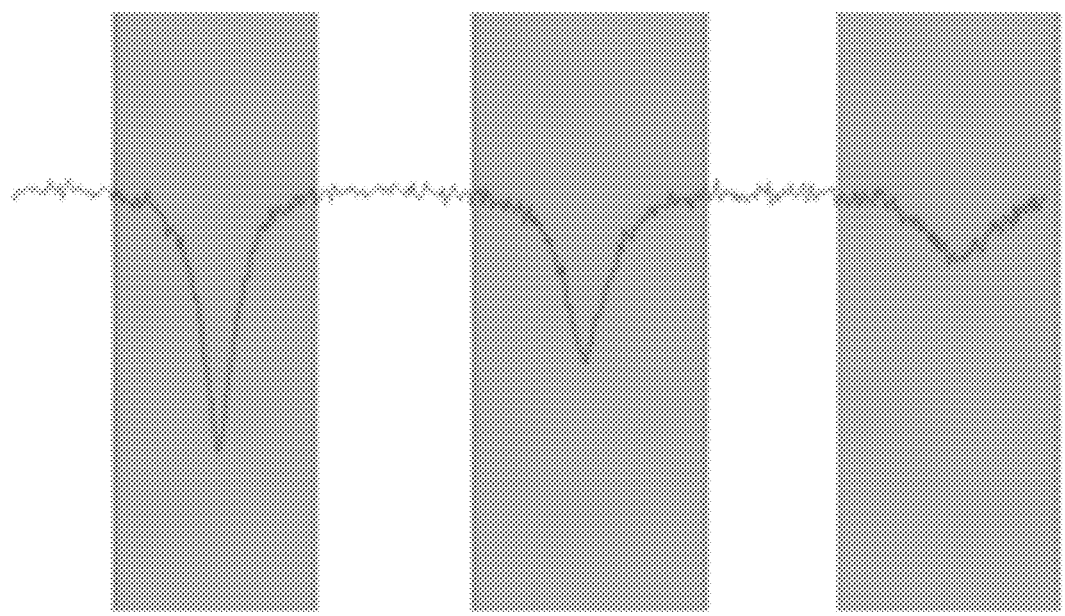
Figure 21:
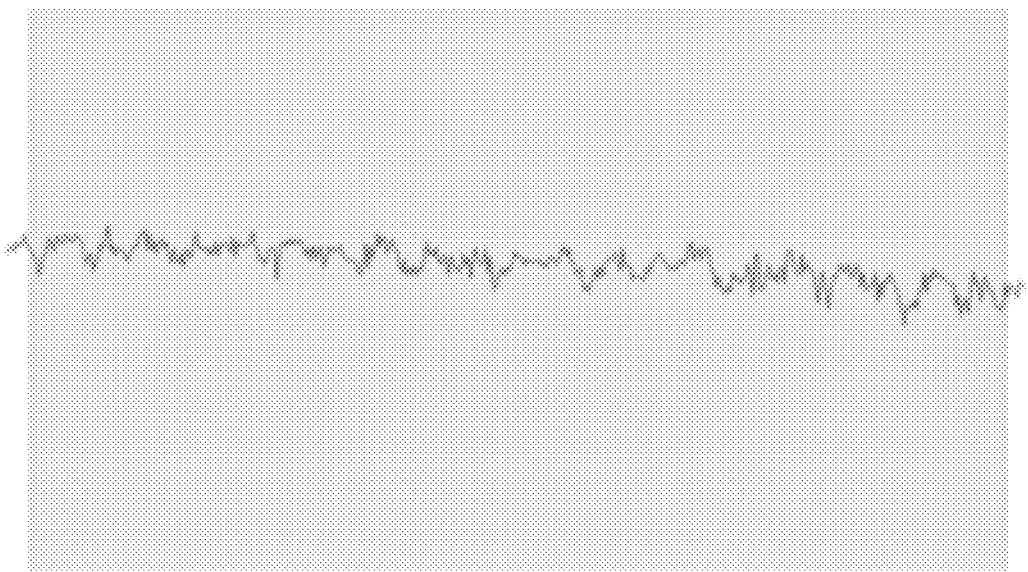
FIGS. 21, 22, 23, 24, 25, 26 and 27 show graphs of various waves that were detected and classified by the methods disclosed herein shaded.
Figure 22:
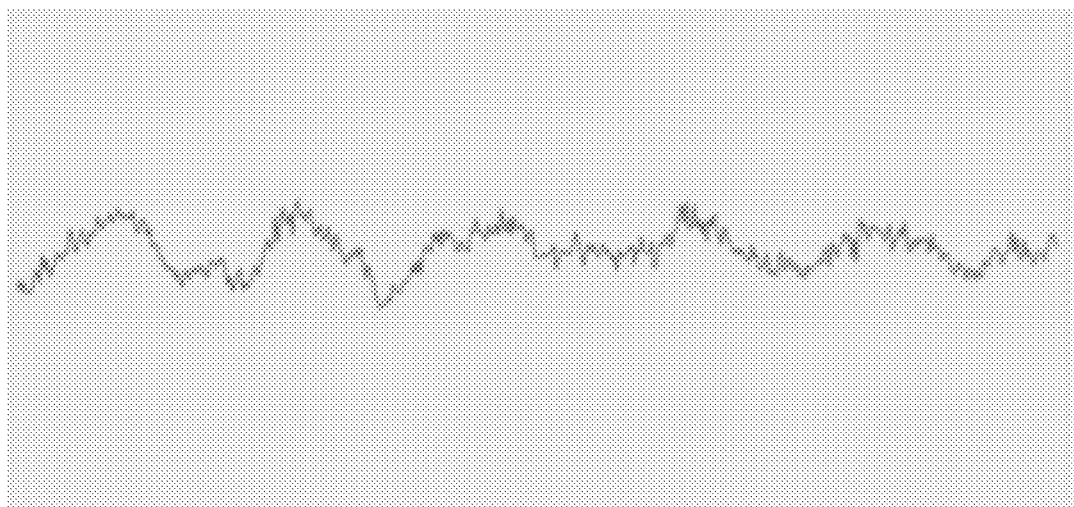
Figure 23:
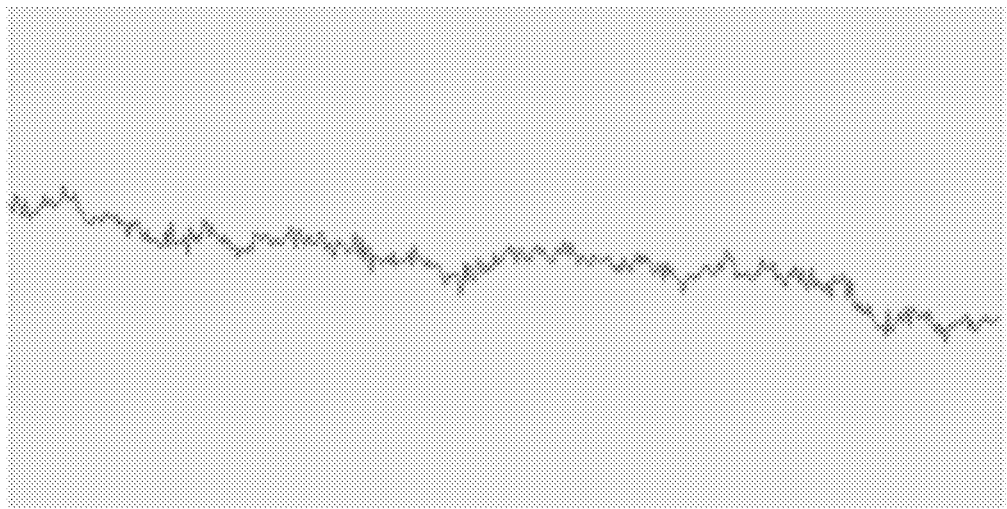
Figure 24:
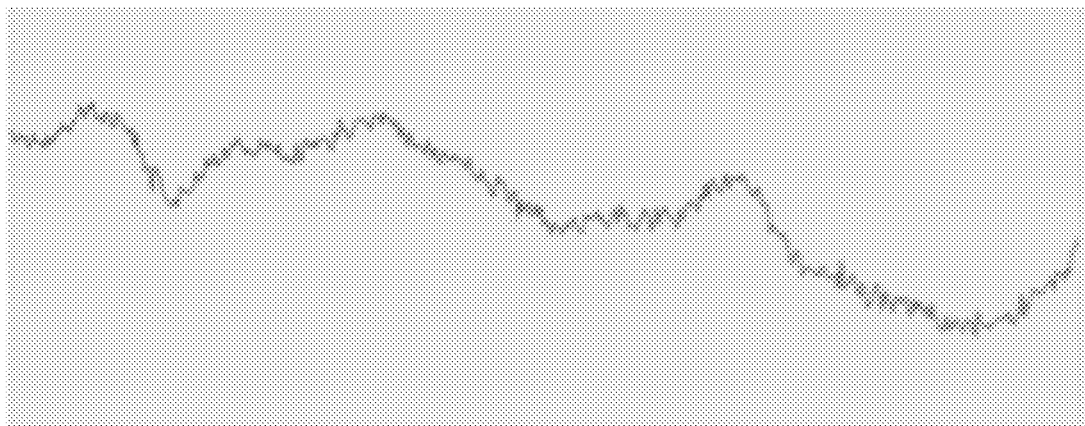
Figure 25:
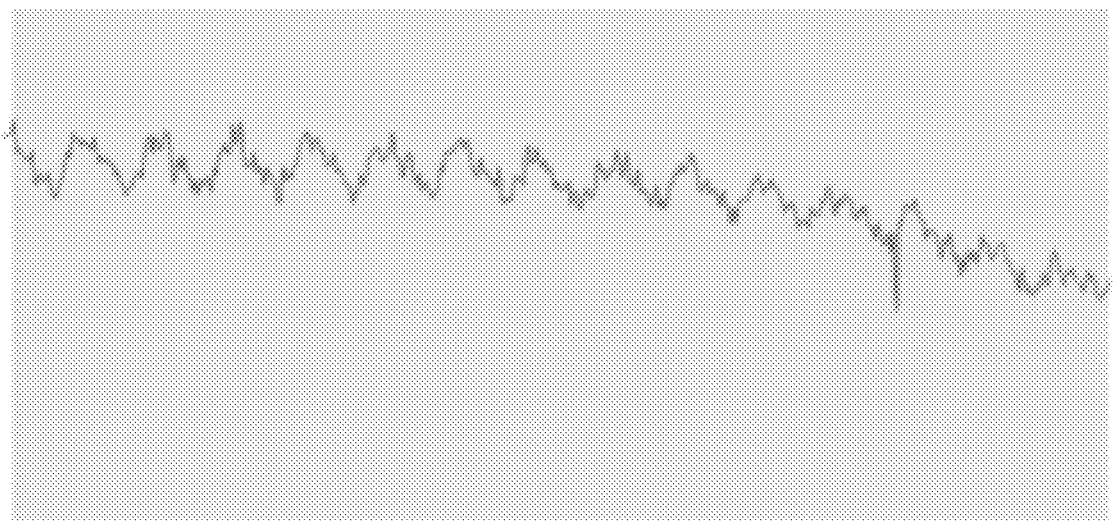
Figure 26:
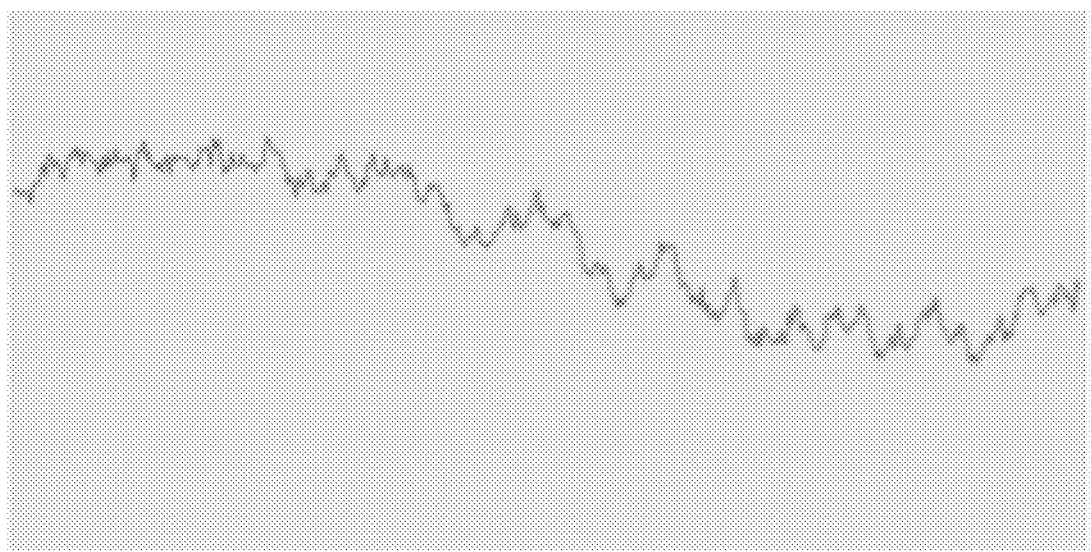
Figure 27:
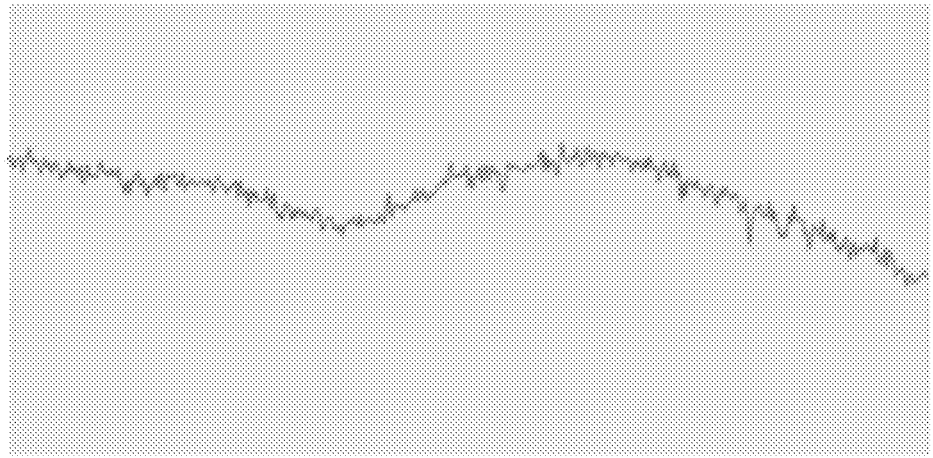
Figure 28:
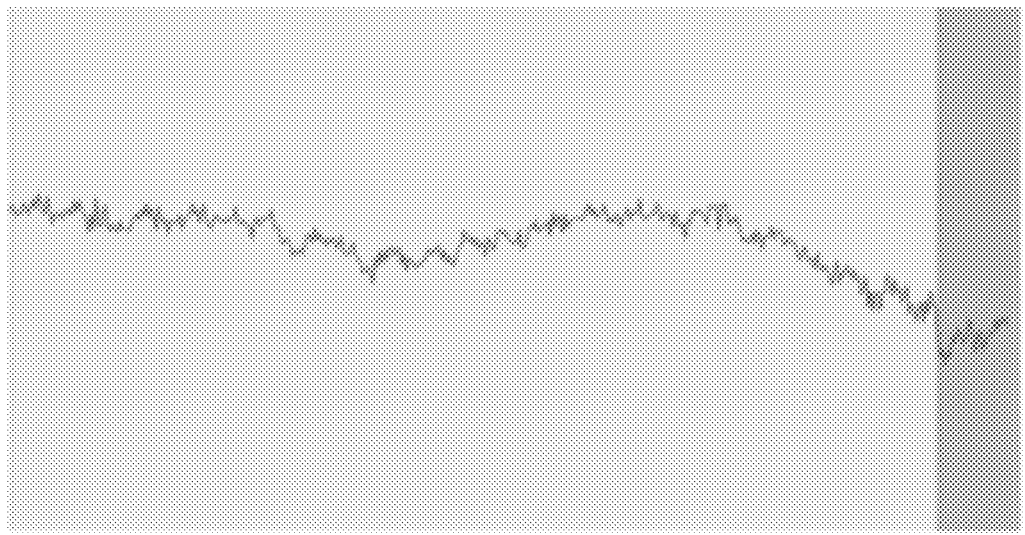
FIG. 28 shows a graph of a combination of waves and LTE ingress on the higher frequency side of a spectrum that were detected and classified by the methods disclosed herein shaded.

Detection was performed on DOCSIS 3.1 DS RxMER data. FIGS. 3-28 show the detection of LTE ingress, roll-off, echo/wave patterns, spikes and suckout. FIGS. 3, 4, 5, 6, 7 and 8 show graphs of actual network data with LTE ingress features that were detected and classified by the methods disclosed herein shaded. FIG. 9 shows a graph of RxMER data having two LTE ingress features and two spikes that were detected and classified by the methods disclosed herein shaded. Spikes may indicate phenomena like unexpected channel sweeping signals. FIG. 10 shows a graph of RxMER data having five spikes that were detected and classified by the methods disclosed herein shaded. FIG. 11 shows a graph having roll-off on the higher frequency side of an orthogonal frequency domain multiplex (OFDM) channel that was detected and classified by the methods disclosed herein shaded. FIG. 12 shows a graph having roll-off on the low frequency end of an orthogonal frequency domain multiplex (OFDM) channel that was detected and classified by the methods disclosed herein shaded. FIG. 13 shows a graph having a wide standing wave on an orthogonal frequency domain multiplex (OFDM) channel that was detected and classified by the methods disclosed herein shaded. FIG. 14 shows a graph having a relatively narrow standing wave on an orthogonal frequency domain multiplex (OFDM) channel that was detected and classified by the methods disclosed herein shaded. FIG. 15 shows a graph having four spikes that were detected and classified by the methods disclosed herein shaded. FIG. 16 shows a graph having a wide standing wave with a significant spike on an orthogonal frequency domain multiplex (OFDM) channel that was detected and classified by the methods disclosed herein shaded. FIG. 17 shows a graph having a wide and deep suckout that was detected and classified by the methods disclosed herein shaded. This phenomenon is normally caused by amplifiers. FIGS. 18, 19 and 20 show graphs of suckouts on an orthogonal frequency domain multiplex (OFDM) channel that were detected and classified by the methods disclosed herein shaded. FIGS. 21, 22, 23, 24, 25, 26 and 27 show graphs of various waves that were detected and classified by the methods disclosed herein shaded. FIG. 28 shows a graph of a combination of waves and LTE ingress on the higher frequency side of a spectrum that were detected and classified by the methods disclosed herein shaded. Various types of waves, including waves of varying widths, standing waves and combinations of multiple standing waves, are shown.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for detecting and classifying an anomalous feature in one-dimensional data, the method comprising:
using a one-dimensional convolutional layer to generate a bounding region containing a single spatial variable around an anomalous feature within one-dimensional test data and to determine whether the anomalous feature in the one-dimensional test data falls into a class of anomalous features taught to a neural network using one-dimensional training data.

2. The method of claim 1 further comprising training the neural network to detect and classify anomalous features in the one-dimensional training data.

3. The method of claim 2, wherein the step of training the neural network maintains the width of an anomalous feature in the training data relative to the width of the training data at all times.

4. The method of claim 1, wherein the neural network is trained on one-dimensional data that has been smoothed, value scale shifted, flipped, floor shifted, noise injected and/or synthesized.

5. The method of claim 4, wherein the synthesized data is fully fabricated or injected with an anomalous feature.

6. The method of claim 1, wherein the one-dimensional test data is time series data.

7. The method of claim 1, wherein the one-dimensional test data is power over time data, signal to noise ratio (SNR) over time data, modulation error ratio (MER) data, full band capture data, radio frequency data, temperature data, vibration sensor data, humidity data, voltage data, electrical current data, pH value over time data or motion sensor data.

8. The method of claim 1, wherein the step of using the one-dimensional convolutional layer to generate a bounding region is carried out by a YOLO-type algorithm.

9. The method of claim 1, wherein the bounding region comprises x, w, class, and a confidence value indicating a likelihood of an anomalous feature being present, where x is the center of the bounding region, w is the width of the bounding region, and class is an ID number associated with the class of the anomalous feature.

10. The method of claim 1 further comprising localizing the anomalous feature within the one-dimensional test data.

11. The method of claim 10 further comprising identifying one or more devices generating the one-dimensional test data comprising the anomalous feature.

12. The method of claim 11, wherein the anomalous feature is selected from the group consisting of LTE ingress, a MER spike, amplifier suckout, frequency roll-off, waves, wireless interference patterns, tilt patterns, sweep signal patterns and combinations thereof.

13. The method of claim 1 further comprising scaling the one-dimensional test data while preserving anomalous features by:
   increasing a number of data points within the one-dimensional test data to generate up-sampled one-dimensional data that is divisible by a predetermined integer;
   dividing the up-sampled data into a number of bins equal to the predetermined integer;
   calculating a single value for each bin; and
   replacing each bin with the single value to obtain down-sampled data.

14. The method of claim 13, wherein the single value for each bin is the mean, median, mode, average, minimum, maximum, or quantile of data points within the bin.

15. A non-transitory computer-readable medium having a plurality of non-transitory instructions executable with a processor for detecting and classifying anomalous features in one-dimensional data, the plurality of non-transitory instructions being executable for:
   using a one-dimensional convolutional layer to generate a bounding region containing a single spatial variable around an anomalous feature within one-dimensional test data and to determine whether the anomalous feature in the one-dimensional test data falls into a class of anomalous features taught to a neural network using one-dimensional training data.

16. The non-transitory computer-readable medium of claim 15 further comprising the plurality of non-transitory instructions being executable for training the neural network to detect and classify anomalous features in the one-dimensional training data.

17. The non-transitory computer-readable medium of claim 16, wherein the step of training the neural network maintains the width of the anomalous feature in the training data relative to the width of the training data at all times.

18. The non-transitory computer-readable medium of claim 15 further comprising the plurality of non-transitory instructions being executable for localizing the anomalous feature within the one-dimensional test data.

19. The non-transitory computer-readable medium of claim 18 further comprising the plurality of non-transitory instructions being executable for identifying one or more devices generating the one-dimensional test data comprising the anomalous feature.

20. The non-transitory computer-readable medium of claim 15 further comprising the plurality of non-transitory instructions being executable for scaling the one-dimensional test data while preserving anomalous features by:
   increasing a number of data points within the one-dimensional test data to generate up-sampled one-dimensional data that is divisible by a predetermined integer;
   dividing the up-sampled data into a number of bins equal to the predetermined integer;
   calculating a single value for each bin; and
   replacing each bin with the single value to obtain down-sampled data.

* * * * *